United States Patent
Lu et al.

(10) Patent No.: US 9,483,386 B2
(45) Date of Patent: Nov. 1, 2016

(54) INFORMATION INTERACTION TEST DEVICE AND METHOD BASED ON AUTOMATIC GENERATION OF ASSOCIATED TEST CASES

(71) Applicant: China Unionpay Co., Ltd., Shanghai (CN)

(72) Inventors: Zhijun Lu, Shanghai (CN); Lijun Zu, Shanghai (CN); Xingjian Wang, Shanghai (CN); Shuo He, Shanghai (CN); Hua Cai, Shanghai (CN)

(73) Assignee: CHINA UNIONPAY CO., LTD., Shanghai (CN)

( * ) Notice: Subject to any disclaimer, the term of this patent is extended or adjusted under 35 U.S.C. 154(b) by 169 days.

(21) Appl. No.: 14/369,185

(22) PCT Filed: Dec. 31, 2012

(86) PCT No.: PCT/CN2012/087973
§ 371 (c)(1),
(2) Date: Jun. 26, 2014

(87) PCT Pub. No.: WO2013/097788
PCT Pub. Date: Jul. 4, 2013

(65) Prior Publication Data
US 2014/0359362 A1 Dec. 4, 2014

(30) Foreign Application Priority Data
Dec. 31, 2011 (CN) .......................... 2011 1 0460805

(51) Int. Cl.
*G06F 11/00* (2006.01)
*G06F 11/36* (2006.01)
(Continued)

(52) U.S. Cl.
CPC ........... *G06F 11/3684* (2013.01); *G06F 11/26* (2013.01); *G06F 11/263* (2013.01); *G06F 11/3676* (2013.01); *G06F 11/3692* (2013.01)

(58) Field of Classification Search
CPC .. G06F 11/3684; G06F 11/26; G06F 11/263; G06F 11/3672; G06F 11/3676; G06F 11/368; G06F 11/3692
USPC ................................ 714/33, 25, 32, 37, 38.1
See application file for complete search history.

(56) References Cited

U.S. PATENT DOCUMENTS 6,243,835 B1    6/2001  Enokido et al.
8,649,995 B2 *  2/2014  Thulasidasan ...... G06F 11/3684
                                                          702/119

(Continued)

FOREIGN PATENT DOCUMENTS

| CN | 101251798 A | 8/2008 |
| CN | 101251825 A | 8/2008 |

OTHER PUBLICATIONS

Office Action for prior Chinese application 201110460805.0.
(Continued)

*Primary Examiner* — Joseph D Manoskey
(74) *Attorney, Agent, or Firm* — Blakely Sokoloff Taylor & Zafman LLP

(57) ABSTRACT

The present invention proposes an information interaction testing device and method based on the associated testing case automatic generation. The associated testing case generation module in said device may automatically generate the associated testing case files corresponding to all associated information interactions which can be triggered by said reference information interaction based on the reference information interaction and the predefined rules determined by the application type provided by the system under test. The information interaction testing device and method based on the associated testing case automatic generation disclosed in the present invention have the higher testing speed and the higher testing usability as well as are low-cost.

19 Claims, 3 Drawing Sheets

(51) Int. Cl.
*G06F 11/26* (2006.01)
*G06F 11/263* (2006.01)

(56) References Cited

U.S. PATENT DOCUMENTS

2005/0154559 A1 7/2005 Jager et al.
2009/0007077 A1 1/2009 Musuvathi et al.
2011/0231708 A1* 9/2011 Lawrance ........... G06F 11/3684
                                                   714/38.1
2012/0198280 A1* 8/2012 Cao .................... G06F 11/3684
                                                   714/32

OTHER PUBLICATIONS

European Search Report, dated Apr. 28, 2016, European Application No. 12863644.

* cited by examiner

INFORMATION INTERACTION TEST DEVICE AND METHOD BASED ON AUTOMATIC GENERATION OF ASSOCIATED TEST CASES

FIELD OF THE INVENTION

The present invention relates to an information interaction testing device and method, and more particularly, to an information interaction testing device and method based on the associated testing case automatic generation.

BACKGROUND

Nowadays, with the increasingly widespread of the network-based applications and increasingly enrichment of business types of different fields (for example, the financial field), the information interaction (especially, the security information (i.e., the information requiring a higher level of security, such as financial transaction information)) interaction) procedure based on the request-answer mode becomes more and more complex, for example, the reference information interaction (i.e., the information interaction which is not associatively generated by other information interactions but occurs independently) usually is accompanied by one or more associated information interactions produced afterwards (i.e., the information interactions initiated for the reference information interaction by the requester after initiating the reference information interaction, for example, in the financial field, the user requests a return after the completion of one consumption transaction, the requester can initiate the return transaction for that consumption transaction, wherein said consumption transaction is the reference information interaction, and the return transaction is the associated transaction), wherein, the associated information interaction and the reference information interaction match with each other through the associated fields, i.e., a set of unique associated fields (for example, in the financial field, the set of unique associated fields may include the original transaction serial number, the original transaction accepting institution identification code, the original transaction time, and the main account, etc.) can cause the associated information interaction to uniquely determine its reference information interaction. Thus, the testing device and method for the information interaction system based on the request-answer mode in which there may be exist one or more associated information interactions become more and more important.

The basic workflow of the existing information interaction testing devices and methods are as follows: (1) pre-configuring the request message templates of the reference information interaction and the associated information interaction (wherein, a part of the fields in said request message template is the dynamically generated fields which needs to be sent after modified); (2) completing a plurality of reference information interactions according to the same request message template in the conventional request-answer mode; (3) acquiring the associated fields value of a certain reference information interaction, and generating or updating the dynamic fields in the request message template of the associated information interaction, and thus producing the request message of the associated information interaction, subsequently completing said associated information interaction in the conventional request-answer mode.

Wherein, in the existing information interaction testing devices and methods, the following two ways are usually used to obtain the value of the associated fields (especially, the dynamic fields) in the request message of the associated information interaction: (1) a tester querying the information interaction log manually to find the record of the reference information interaction, and manually filling in or modifying the value of the associated fields in the request message of the associated information interaction according to the record; and (2) matching the database records by means of an application program, and then automatically modifying the value of the associated fields in the request message of the associated information interaction according to the found out record of the reference information interaction in said database.

However, the above two ways of obtaining the value of the associated fields in the request message of the associated information interaction have the following problems: (1) for the first way, since it needs the tester to manually query the value of the associated fields of the reference information interaction repeatedly in the testing, the testing procedure is complex, the testing speed is slow, and due to the influence of the skill level of the tester, the manual filling in and modifying is prone to error, so that the accuracy of testing results decreases, and the testing efficiency is low; and (2) for the second way, since the testing program is unable to know which one of the same type of reference information interactions will associate with the associated information interaction, the last record of that type of reference information interaction is usually queried from the database, and the value of the associated fields in the request message of the associated information interaction is modified based on that record, therefore, if there are a plurality of same type of reference information interactions, then the subsequent associated information interaction can only associate with the last reference information interaction, and thus this cannot meet the requirements of simulating the real scene and reduces the applicability and testing accuracy of the whole information interaction testing device and method, moreover, due to the need for arranging additional database modules, the cost and complexity of the whole information interaction testing device is increased.

Therefore, there exists the following requirement: providing an information interaction testing device and method based on the associated testing case automatic generation, which have the higher testing speed, the higher testing usability and the higher testing efficiency and is low-cost.

SUMMARY OF THE INVENTION

In order to solve the problems presented in the existing technical solutions described above, the present invention proposes an information interaction testing device and method based on the associated testing case automatic generation.

The objects of the present invention are realized through the following technical solutions:

An information interaction testing device based on the associated testing case automatic generation, said information interaction testing device based on the associated testing case automatic generation comprising:

a configuration module for storing a configuration file and updating said configuration file based on the received configuration command;

a testing execution module for invoking a testing case file and executing an information interaction based on a processing configuration file of the type to which said testing case belonging, and calling an associated testing case generation module to generate an associated testing case respectively for each associated information type according to all associated information types of the type to which the testing case belonging after said information interaction is completed;

the associated testing case generation module for automatically generating the associated testing case files corresponding to all associated information interactions which can be triggered by said reference information interaction based on said reference information interaction and the predefined rules determined by the application type provided by the system under test after receiving said associated testing case generation command, and storing the generated associated testing case files in a predefined file structure of a storage module;

the storage module for storing said reference testing case file, said associated testing case file and the testing case execution result statistical data; and a user interface for receiving the configuration command input by the user, and transferring said configuration command to said configuration module, and also for displaying the testing case execution result statistical data.

In the solutions disclosed above, preferably, said testing execution module is also used for invoking the associated testing case file based on said configuration file and executing the associated information interaction based on said associated testing case file, and sending the associated testing case generation command to said associated testing case generation module in the case of judging that it needs to produce subsequent further associated information interactions after said associated information interaction is completed.

In the solutions disclosed above, preferably, said associated testing case generation module is also used for automatically generating the associated testing case files corresponding to all further associated information interactions which can be triggered by said associated information interaction based on said associated information interaction and the predefined rules determined by the application type provided by the system under test after receiving said associated testing case generation command, and storing the generated associated testing case files in the predefined file structure of said storage module.

In the solutions disclosed above, preferably, said configuration file comprise a processing configuration file of the case type, testing case set scheduling information, the verification condition of each test case and the naming rule of said associated testing case file.

In the solutions disclosed above, preferably, said testing execution module further comprises:

a loading and request message generation unit for loading said reference testing case file or said associated testing case file into the memory based on said scheduling command, and generating the request message applicable to the system under test according to a predefined rule based on said reference testing case file or said associated testing case file, and transmitting said request message to a sending unit;

a sending unit for establishing and maintaining a communication link between said testing execution module and the system under test, and transmitting the received request message to the system under test via said communication link;

a receiving unit for receiving an answer message corresponding to said request message from the system under test within a predefined time threshold, and transmitting said answer message to an answer verification unit; and an answer verification unit for judging whether said answer message is valid based on the predefined rules, and if the judgment result is "valid", said answer verification unit further verifying whether said answer message conforms to the test requirements according to the verification condition corresponding to said reference testing case file or said associated testing case file in said configuration file, and storing the corresponding testing case execution result statistical data in said storage module.

In the solutions disclosed above, preferably, said answer verification unit is also used for judging whether the reference information interaction or the associated information interaction corresponding to said reference testing case file or said associated testing case file needs to produce subsequent associated information interactions based on the predefined rules, and if the judgment result is "needs to produce subsequent associated information interactions", then transmitting the associated testing case generation command to said associated testing case generation module.

In the solutions disclosed above, preferably, the predefined file structure used for storing said reference testing case file and said associated testing case file in said storage module is a tree-form file structure.

In the solutions disclosed above, preferably, the name of said associated testing case file is used as the basis of associating the associated testing case file with its corresponding reference testing case file.

In the solutions disclosed above, preferably, said associated testing case generation module acquires the associated information interaction types which can be generated according to the type of the reference information interaction, and acquires the value of the required associated fields respectively from the request message or answer message of said reference information interaction according to each of the associated information interaction types which can be generated, so that respectively generates each of the associated testing case files based on each of said associated information interaction types which can be generated and the value of the required associated fields.

In the solutions disclosed above, preferably, said associated testing case generation module determines the storing path of said associated testing case file in said tree-form file structure according to the associated information interaction type.

In the solutions disclosed above, preferably, said associated testing case generation module generates the name of said associated testing case file according to said naming rules in said configuration file.

In the solutions disclosed above, preferably, said naming rules can be updated by means of said configuration command.

In the solutions disclosed above, optionally, said naming rule is as follows: the name of the associated testing case file=the name of the reference testing case file+the type-name of the associated information interaction+the date and time of the reference information interaction.

In the solutions disclosed above, optionally, said naming rule is as follows: the name of the associated testing case file=the name of the reference testing case file+the type-name of the associated information interaction.

The objects of the present invention can also be realized through the following technical solutions:

An information interaction testing method based on the associated testing case automatic generation, said information interaction testing method based on the associated testing case automatic generation comprising the following steps:

(A1) invoking a reference testing case file based on a configuration file and executing a reference information interaction based on said reference testing case file;

(A2) after said reference information interaction is completed, in the case of judging that it needs to produce subsequent associated information interactions, automatically generating the associated testing case files corresponding to all associated information interactions which can be triggered by said reference information interaction based on said reference information interaction and the predefined rules determined by the application type provided by the system under test, and storing the generated associated testing case files in a predefined file structure;

(A3) invoking the associated testing case file based on said configuration file and executing the associated information interaction based on said associated testing case file; and (A4) after said associated information interaction is completed, in the case of judging that it needs to produce subsequent further associated information interactions, automatically generating the associated testing case files corresponding to all further associated information interactions which can be triggered by said associated information interaction based on said associated information interaction and the predefined rules determined by the application type provided by the system under test, and storing the generated associated testing case files in said predefined file structure, and then returning to the step (A3) until the end of the entire testing procedure.

In the solutions disclosed above, preferably, said configuration file comprise the testing case set scheduling information, the verification condition of each test case and the naming rules of said associated testing case file.

In the solutions disclosed above, preferably, said step (A1) further comprises:

(B1) loading said reference testing case file into the memory based on said configuration file, and generating the request message applicable to the system under test according to a predefined rule based on said reference testing case file;

(B2) transmitting said request message to the system under test;

(B3) receiving an answer message corresponding to said request message from the system under test within a predefined time threshold; and (B4) judging whether said answer message is valid based on the predefined rules, and if the judgment result is "valid", then verifying whether said answer message conforms to the test requirements according to the verification condition corresponding to said reference testing case file in said configuration file, and storing the corresponding testing case execution result statistical data.

In the solutions disclosed above, preferably, said step (A3) further comprises:

(C1) loading said associated testing case file into the memory based on said configuration file, and generating the request message applicable to the system under test according to the predefined rules based on said associated testing case file;

(C2) transmitting said request message to the system under test;

(C3) receiving the answer message corresponding to said request message from the system under test within the predefined time threshold; and (C4) judging whether said answer message is valid based on the predefined rules, and if the judgment result is "valid", then further verifying whether said answer message conforms to the test requirements according to the verification condition corresponding to said associated testing case file in said configuration file, and storing the corresponding testing case execution result statistical data.

In the solutions disclosed above, preferably, said step (A1) further comprises: judging whether the reference information interaction corresponding to said reference testing case file needs to produce subsequent associated information interactions based on the predefined rules, and if the judgment result is "needs to produce subsequent associated information interactions", then executing the step (A2).

In the solutions disclosed above, preferably, said step (A3) further comprises: judging whether the associated information interaction corresponding to said associated testing case file needs to produce subsequent associated information interactions based on the predefined rules, and if the judgment result is "needs to produce subsequent associated information interactions", then executing the step (A4).

In the solutions disclosed above, preferably, the predefined file structure used for storing said reference testing case file and said associated testing case file is a tree-form file structure.

In the solutions disclosed above, preferably, the storing path of the generated associated testing case file in said tree-form file structure and the name of said associated testing case file are used as the basis of associating the associated testing case file with its corresponding reference testing case file.

In the solutions disclosed above, preferably, the associated information interaction types which can be generated are acquired according to the type of the reference information interaction, and the value of the required associated fields are acquired respectively from the request message or the answer message of said reference information interaction according to each of the associated information interaction types which can be generated, so that each of the associated testing case files are generated respectively based on each of said associated information interaction types which can be generated and the value of the required associated fields.

In the solutions disclosed above, preferably, the storing path of said associated testing case file in said tree-form file structure is determined according to the associated information interaction type.

In the solutions disclosed above, preferably, the name of said associated testing case file is generated according to the naming rule in said configuration file.

In the solutions disclosed above, preferably, said naming rule can be updated by means of said configuration command.

In the solutions disclosed above, optionally, said naming rule is as follows: the name of the associated testing case file=the name of the reference testing case file+the type-name of the associated information interaction+the date and time of the reference information interaction.

In the solutions disclosed above, optionally, said naming rule is as follows: the name of the associated testing case file=the name of the reference testing case file+the type-name of the associated information interaction.

The information interaction testing device and method based on the associated testing case automatic generation disclosed in the present invention have the following advantages: since the associated testing case can be automatically generated, said device and method have the higher testing speed and the higher testing usability, in turn have the better testing efficiency, and are low-cost.

BRIEF DESCRIPTION OF THE DRAWINGS

The technical features and advantages of the present invention will be better appreciated by one skilled in the art in conjunction with the accompanying drawings, in which.

DETAILED DESCRIPTION OF THE INVENTION

Figure 1:
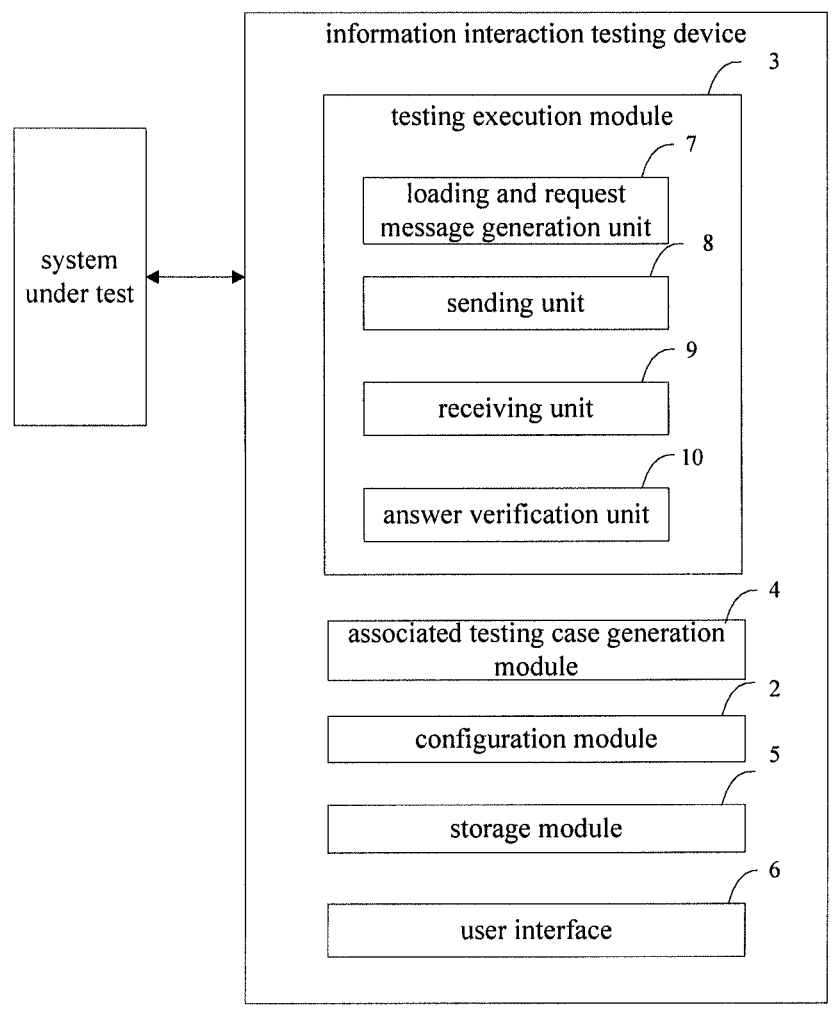
FIG. 1 is the architecture diagram of the information interaction testing device based on the associated testing case automatic generation according to the embodiment of the present invention.

FIG. 1 is an architecture diagram of the information interaction testing device based on the associated testing case automatic generation according to the embodiment of the present invention. As shown in FIG. 1, the information interaction testing device based on the associated testing case automatic generation disclosed in the present invention comprises a configuration module 2, a testing execution module 3, an associated testing case generation module 4, a storage module 5 and a user interface 6. Said configuration module 2 is used for storing a configuration file and updating said configuration file based on the received configuration command. Said testing execution module 3 is used for invoking a reference testing case file based on said configuration file and executing a reference information interaction based on said reference testing case file, and for sending the associated testing case generation command to said associated testing case generation module 4 in the case of judging that it needs to produce subsequent associated information interactions after said reference information interaction is completed. Said associated testing case generation module 4 is used for automatically generating the associated testing case files corresponding to all associated information interactions which can be triggered by said reference information interaction based on said reference information interaction and the predefined rules determined by the application type provided by the system under test after receiving said associated testing case generation command, and storing the generated associated testing case files in a predefined file structure of the storage module 5. Said storage module 5 is used for storing said reference testing case file, said associated testing case file and the testing case execution result statistical data. Said user interface 6 is used for receiving the configuration command input by the user, and transferring said configuration command to said configuration module 2, and also for displaying said testing case execution result statistical data.

Preferably, in the information interaction testing device based on the associated testing case automatic generation disclosed in the present invention, said testing execution module 3 is also used for invoking the associated testing case file based on said configuration file and executing the associated information interaction based on said associated testing case file, and sending the associated testing case generation command to said associated testing case generation module 4 in the case of judging that it needs to produce subsequent further associated information interactions after said associated information interaction is completed.

Preferably, in the information interaction testing device based on the associated testing case automatic generation disclosed in the present invention, said associated testing case generation module 4 is also used for automatically generating the associated testing case files corresponding to all further associated information interactions which can be triggered by said associated information interaction based on said associated information interaction and the predefined rule determined by the application type provided by the system under test after receiving said associated testing case generation command, and storing the generated associated testing case files in the predefined file structure of said storage module 5.

Preferably, in the information interaction testing device based on the associated testing case automatic generation disclosed in the present invention, said configuration file comprise the testing case set scheduling information, the verification condition of each test case and the naming rule of said associated testing case file.

Preferably, in the information interaction testing device based on the associated testing case automatic generation disclosed in the present invention, said testing execution module 3 further comprises a loading and request message generation unit 7, a sending unit 8, a receiving unit 9 and an answer verification unit 10. Said loading and request message generation unit 7 is used for loading said reference testing case file or said associated testing case file into a memory based on said scheduling command, and generating the request message applicable to the system under test according to the predefined rules based on said reference testing case file or said associated testing case file, and transmitting said request message to the sending unit 8. Said sending unit 8 is used for establishing and maintaining a communication link between said testing execution module 3 and the system under test, and transmitting the received request message to the system under test via said communication link. Said receiving unit 9 is used for receiving an answer message corresponding to said request message from the system under test within a predefined time threshold, and transmitting said answer message to the answer verification unit 10. Said answer verification unit 10 is used for judging whether said answer message is valid based on the predefined rules (for example, calculating the MAC fields of said answer message), and if the judgment result is "valid", said answer verification unit 10 further verifies whether said answer message conforms to the test requirements according to the verification condition corresponding to said reference testing case file or said associated testing case file in said configuration file, and stores the corresponding testing case execution result statistical data in said storage module 5.

Preferably, in the information interaction testing device based on the associated testing case automatic generation disclosed in the present invention, said answer verification unit 10 is also used for judging whether the reference information interaction or the associated information interaction corresponding to said reference testing case file or said associated testing case file needs to produce subsequent associated information interactions based on the predefined rules, and if the judgment result is "need to produce subsequent associated information interactions", then transmitting said associated testing case generation command to said associated testing case generation module 4.

Preferably, in the information interaction testing device based on the associated testing case automatic generation disclosed in the present invention, the predefined file structure used for storing said reference testing case file and said associated testing case file in said storage module 5 is a tree-form file structure.

Preferably, in the information interaction testing device based on the associated testing case automatic generation disclosed in the present invention, the storing path of said generated associated testing case file in said tree-form file structure and the name of said associated testing case file are used as the basis of associating the associated testing case file with its corresponding reference testing case file.

Preferably, in the information interaction testing device based on the associated testing case automatic generation disclosed in the present invention, said associated testing case generation module 4 acquires the associated information interaction types which can be generated according to the type of the reference information interaction, and acquires the value of the required associated fields respectively from the request message or answer message of said reference information interaction according to each of the associated information interaction types which can be generated, so as to respectively generate each of the associated testing case files based on each of said associated information interaction types which can be generated and the value of the required associated fields.

Preferably, in the information interaction testing device based on the associated testing case automatic generation disclosed in the present invention, said associated testing case generation module 4 determines the storing path of said associated testing case file in said tree-form file structure according to the associated information interaction type (including the main type and the subtype).

Preferably, in the information interaction testing device based on the associated testing case automatic generation disclosed in the present invention, said associated testing case generation module 4 generates the name of said associated testing case file according to said naming rule in said configuration file.

Preferably, in the information interaction testing device based on the associated testing case automatic generation disclosed in the present invention, said naming rule can be updated by means of said configuration command.

Exemplarily, in the information interaction testing device based on the associated testing case automatic generation disclosed in the present invention, said naming rule is as follows: the name of the associated testing case file=the name of the reference testing case file+the type-name of the associated information interaction+the date and time of the reference information interaction (wherein, "the name of the reference testing case file" and "the date and time of the reference information interaction" in the name of the associated testing case file clearly indicate the associated reference information interaction).

Figure 2:
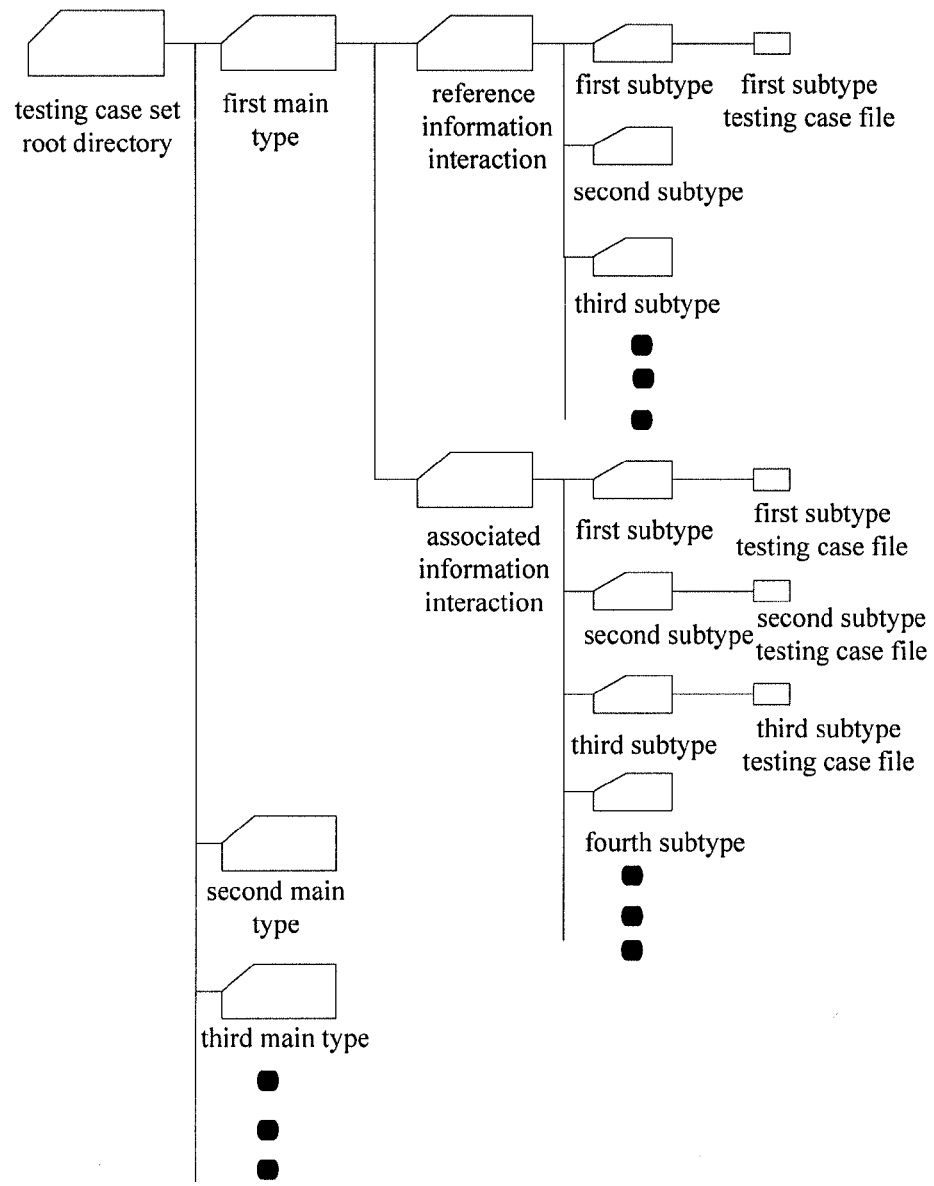
FIG. 2 is the storage structure schematic drawing of the testing message file of the information interaction testing device and method based on the associated testing case automatic generation according to the embodiment of the present invention.

FIG. 2 is the storage structure schematic drawing of the testing message file of the information interaction testing device and method based on the associated testing case automatic generation according to the embodiment of the present invention. As shown in FIG. 2, the predefined file structure used for storing said reference testing case file and said associated testing case file is a tree-form file structure, and the storing path of said generated associated testing case file in said tree-form file structure and the name of said associated testing case file are used as the basis of associating the associated testing case file with its corresponding reference testing case file.

Figure 3:
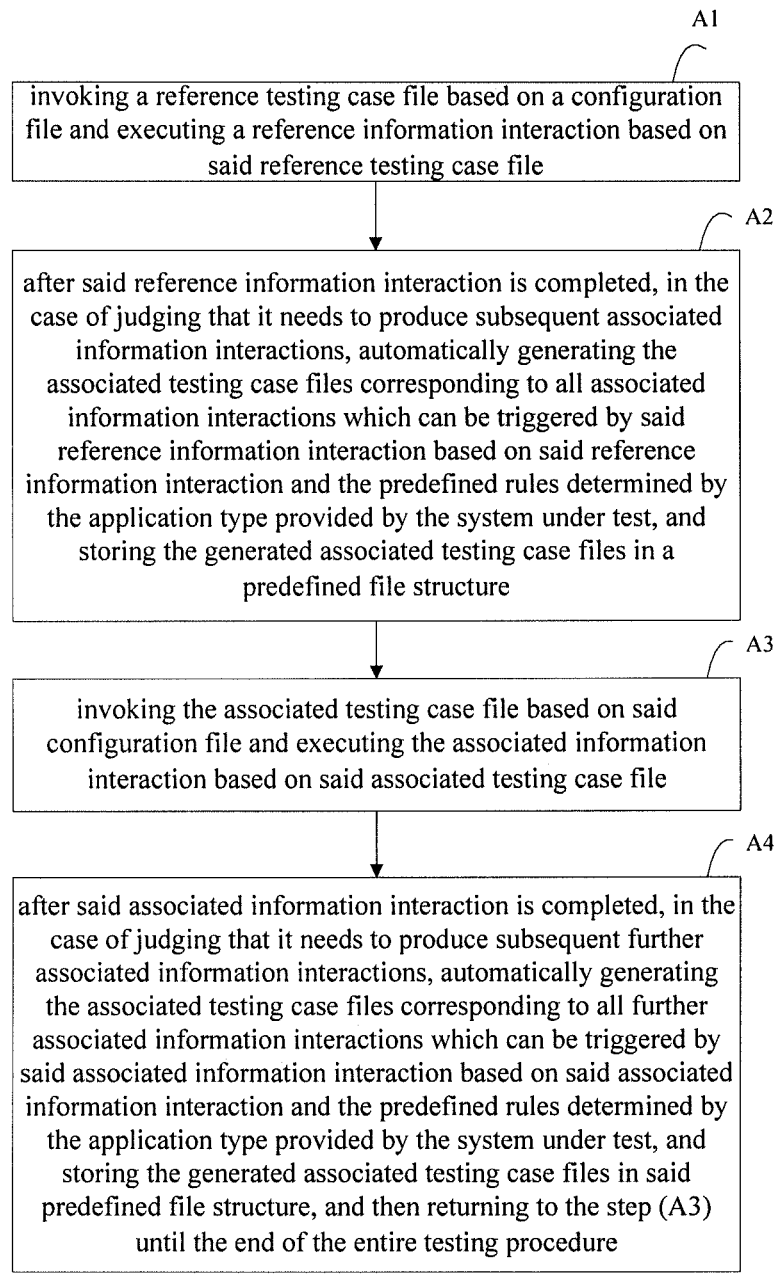
FIG. 3 is the flow diagram of the information interaction testing method based on the associated testing case automatic generation according to the embodiment of the present invention.

FIG. 3 is the flow diagram of the information interaction testing method based on the associated testing case automatic generation according to the embodiment of the present invention. As shown in FIG. 3, the information interaction testing method based on the associated testing case automatic generation disclosed in the present invention comprises the following steps: (A1) invoking a reference testing case file based on a configuration file and executing a reference information interaction based on said reference testing case file; (A2) after said reference information interaction is completed, in the case of judging that it needs to produce subsequent associated information interactions, automatically generating the associated testing case files corresponding to all associated information interactions which can be triggered by said reference information interaction based on said reference information interaction and the predefined rules determined by the application type provided by the system under test, and storing the generated associated testing case files in a predefined file structure; (A3) invoking the associated testing case file based on said configuration file and executing the associated information interaction based on said associated testing case file; and (A4) after said associated information interaction is completed, in the case of judging that it needs to produce subsequent further associated information interactions, automatically generating the associated testing case files corresponding to all further associated information interactions which can be triggered by said associated information interaction based on said associated information interaction and the predefined rules determined by the application type provided by the system under test, and storing the generated associated testing case files in said predefined file structure, and then returning to the step (A3) until the end of the entire testing procedure.

Preferably, in the information interaction testing method based on the associated testing case automatic generation disclosed in the present invention, said configuration file comprise the testing case set scheduling information, the verification condition of each test case and the naming rule of said associated testing case file.

Preferably, in the information interaction testing method based on the associated testing case automatic generation disclosed in the present invention, said step (A1) further comprises: (B1) loading said reference testing case file into the memory based on said configuration file, and generating the request message applicable to the system under test according to a predefined rule based on said reference testing case file; (B2) transmitting said request message to the system under test; (B3) receiving the answer message corresponding to said request message from the system under test within a predefined time threshold; and (B4) judging whether said answer message is valid based on the predefined rules (for example, calculating the MAC fields of said answer message), and if the judgment result is "valid", then verifying whether said answer message conforms to the test requirements according to the verification condition corresponding to said reference testing case file in said configuration file, and storing the corresponding testing case execution result statistical data.

Preferably, in the information interaction testing method based on the associated testing case automatic generation disclosed in the present invention, said step (A3) further comprises: (C1) loading said associated testing case file into the memory based on said configuration file, and generating the request message applicable to the system under test according to the predefined rules based on said associated testing case file; (C2) transmitting said request message to the system under test; (C3) receiving the answer message corresponding to said request message from the system under test within the predefined time threshold; and (C4) judging whether said answer message is valid based on the predefined rules (for example, calculating the MAC fields of said answer message), and if the judgment result is "valid", then further verifying whether said answer message conforms to the test requirements according to the verification condition corresponding to said associated testing case file in said configuration file, and storing the corresponding testing case execution result statistical data.

Preferably, in the information interaction testing method based on the associated testing case automatic generation disclosed in the present invention, said step (A1) further comprises: judging whether the reference information interaction corresponding to said reference testing case file needs to produce subsequent associated information interactions based on the predefined rules, and if the judgment result is "need to produce subsequent associated information interactions", then executing the step (A2).

Preferably, in the information interaction testing method based on the associated testing case automatic generation disclosed in the present invention, said step (A3) further comprises: judging whether the associated information interaction corresponding to said associated testing case file needs to produce subsequent associated information interactions based on the predefined rules, and if the judgment result is "need to produce subsequent associated information interactions", then executing the step (A4).

Preferably, in the information interaction testing method based on the associated testing case automatic generation disclosed in the present invention, the predefined file structure used for storing said reference testing case file and said associated testing case file is a tree-form file structure.

Preferably, in the information interaction testing method based on the associated testing case automatic generation disclosed in the present invention, the storing path of the generated associated testing case file in said tree-form file structure and the name of said associated testing case file are used as the basis of associating the associated testing case file with its corresponding reference testing case file.

Preferably, in the information interaction testing method based on the associated testing case automatic generation disclosed in the present invention, the associated information interaction types which can be generated are acquired according to the type of the reference information interaction, and the value of the required associated fields is acquired respectively from the request message or answer message of said reference information interaction according to each of the associated information interaction types which can be generated, so that each of the associated testing case files are generated respectively based on each of said associated information interaction types which can be generated and the value of the required associated fields.

Preferably, in the information interaction testing method based on the associated testing case automatic generation disclosed in the present invention, the storing path of said associated testing case file in said tree-form file structure is determined according to the associated information interaction type (including the main type and the subtype).

Preferably, in the information interaction testing method based on the associated testing case automatic generation disclosed in the present invention, the name of said associated testing case file is generated according to said naming rule in said configuration file.

Preferably, in the information interaction testing method based on the associated testing case automatic generation disclosed in the present invention, said naming rule can be updated by means of said configuration command.

Exemplarily, in the information interaction testing method based on the associated testing case automatic generation disclosed in the present invention, said naming rule is as follows: the name of the associated testing case file=the name of the reference testing case file+the type-name of the associated information interaction+the date and time of the reference information interaction (wherein, "the name of the reference testing case file" and "the date and time of the reference information interaction" in the name of the associated testing case file clearly indicate the associated reference information interaction).

Although the present invention is described by way of the preferred embodiments mentioned above, but its realization form is not limited to aforementioned embodiments. It should be recognized that various changes and modifications can be made to the present invention by one skilled in the art without departing from the spirit and scope of the invention.

What is claimed is:

1. An information interaction testing device based on an associated testing case automatic generation, said information interaction testing device based on the associated testing case automatic generation comprising:
   a configuration module for storing a configuration file and updating said configuration file based on a configuration command input by a user;
   a testing execution module for invoking a testing case file and executing an information interaction based on a processing configuration file of the type to which said testing case belongs, and calling an associated testing case generation module to generate an associated testing case respectively for each associated information type according to all associated information types of the type to which the testing case belongs after said information interaction is completed;
   the associated testing case generation module for automatically generating associated testing case files corresponding to all associated information interactions which can be triggered by said reference information interaction based on said reference information interaction and predefined rules determined by the application type provided by the system under test after receiving said associated testing case generation command, and storing the generated associated testing case files in a predefined file structure of a storage module;
   a storage module for storing said reference testing case file, said associated testing case file and testing case execution result statistical data; and
   a user interface for receiving the configuration command input by the user, and transferring said configuration command to said configuration module, and also for displaying said testing case execution result statistical data,
   wherein said testing execution module is also used for invoking the associated testing case file based on said configuration file and executing the associated information interaction based on said associated testing case file, and sending the associated testing case generation command to said associated testing case generation module in the case of judging that it needs to produce subsequent further associated information interactions after said associated information interaction is completed.

2. The information interaction testing device based on the associated testing case automatic generation as claimed in claim 1, characterized in that, said associated testing case generation module is also used for automatically generating the associated testing case files corresponding to all further associated information interactions which can be triggered by said associated information interaction based on said associated information interaction and the predefined rules determined by the application type provided by the system under test after receiving said associated testing case generation command, and storing the generated associated testing case files in the predefined file structure of said storage module.

3. The information interaction testing device based on the associated testing case automatic generation as claimed in claim 2, characterized in that, said configuration file comprise a processing configuration file presented in form of the case, the testing case set scheduling information, the verification condition of each test case and the naming rules of said associated testing case file.

4. The information interaction testing device based on the associated testing case automatic generation as claimed in claim 3, characterized in that, said testing execution module further comprises:
- a loading and request message generation unit for loading said reference testing case file or said associated testing case file into the memory based on said scheduling command, and generating the request message applicable to the system under test according to a predefined rule based on said reference testing case file or said associated testing case file, and transmitting said request message to a sending unit;
- a sending unit for establishing and maintaining the communication link between said testing execution module and the system under test, and transmitting the received request message to the system under test via said communication link;
- a receiving unit for receiving an answer message corresponding to said request message from the system under test within a predefined time threshold, and transmitting said answer message to an answer verification unit; and
- an answer verification unit for judging whether said answer message is valid based on the predefined rules, and if the judgment result is "valid", said answer verification unit further verifying whether said answer message conforms to the test requirements according to the verification condition corresponding to said reference testing case file or said associated testing case file in said configuration file, and storing the corresponding testing case execution result statistical data in said storage module.

5. The information interaction testing device based on the associated testing case automatic generation as claimed in claim 4, characterized in that, said answer verification unit is also used for judging whether the reference information interaction or the associated information interaction corresponding to said reference testing case file or said associated testing case file needs to produce subsequent associated information interactions based on the predefined rules, and if the judgment result is "need to produce subsequent associated information interactions", then transmitting said associated testing case generation command to said associated testing case generation module.

6. The information interaction testing device based on the associated testing case automatic generation as claimed in claim 5, characterized in that, the predefined file structure used for storing said reference testing case file and said associated testing case file in said storage module is a tree-form file structure.

7. The information interaction testing device based on the associated testing case automatic generation as claimed in claim 6, characterized in that, the name of said associated testing case file is used as the basis of associating the associated testing case file with its corresponding reference testing case file.

8. The information interaction testing device based on the associated testing case automatic generation as claimed in claim 7, characterized in that, said associated testing case generation module acquires the associated information interaction types which can be generated according to the type of the reference information interaction, and acquires the value of the required associated fields respectively from the request message or answer message of said reference information interaction according to each of the associated information interaction types which can be generated, so as to respectively generate each of the associated testing case files based on each of said associated information interaction types which can be generated and the value of the required associated fields.

9. The information interaction testing device based on the associated testing case automatic generation as claimed in claim 8, characterized in that, said associated testing case generation module determines the storing path of said associated testing case file in said tree-form file structure according to the associated information interaction type.

10. The information interaction testing device based on the associated testing case automatic generation as claimed in claim 9, characterized in that, said associated testing case generation module generates the name of said associated testing case file according to the naming rules in said configuration file.

11. The information interaction testing device based on the associated testing case automatic generation as claimed in claim 10, characterized in that, said naming rule can be updated by means of said configuration command.

12. The information interaction testing device based on the associated testing case automatic generation as claimed in claim 11, characterized in that, said naming rule is as follows: the name of the associated testing case file=the name of the reference testing case file+the type-name of the associated information interaction+the date and time of the reference information interaction.

13. The information interaction testing device based on the associated testing case automatic generation as claimed in claim 11, characterized in that, said naming rule is as follows: the name of the associated testing case file=the name of the reference testing case file+the type-name of the associated information interaction.

14. An information interaction testing method based on the associated testing case automatic generation, said information interaction testing method based on the associated testing case automatic generation comprising the following steps:
- (A1) invoking a reference testing case file based on a configuration file and executing a reference information interaction based on said reference testing case file;
- (A2) after said reference information interaction is completed, in the case of judging that it needs to produce subsequent associated information interactions, automatically generating the associated testing case files corresponding to all associated information interactions which can be triggered by said reference information interaction based on said reference information interaction and the predefined rules determined by the application type provided by the system under test, and storing the generated associated testing case files in a predefined file structure;
- (A3) invoking the associated testing case file based on said configuration file and executing the associated information interaction based on said associated testing case file; and (A4) after said associated information interaction is completed, in the case of judging that it needs to produce subsequent further associated information interactions, automatically generating the associated testing case files corresponding to all further associated information interactions which can be triggered by said associated information interaction based on said associated information interaction and the predefined rules determined by the application type provided by the system under test, and storing the generated associated testing case files in said predefined file structure, and then returning to the step (A3) until the end of the entire testing procedure.

15. The information interaction testing method based on the associated testing case automatic generation as claimed in claim 14, characterized in that, said configuration file comprise the testing case set scheduling information, the verification condition of each test case and the naming rule of said associated testing case file.

16. The information interaction testing method based on the associated testing case automatic generation as claimed in claim 15, characterized in that, said step (A1) further comprises:
- (B1) loading said reference testing case file into the memory based on said configuration file, and generating the request message applicable to the system under test according to a predefined rule based on said reference testing case file;
- (B2) transmitting said request message to the system under test;
- (B3) receiving an answer message corresponding to said request message from the system under test within a predefined time threshold; and
- (B4) judging whether said answer message is valid based on the predefined rules, and if the judgment result is "valid", then verifying whether said answer message conforms to the test requirements according to the verification condition corresponding to said reference testing case file in said configuration file, and storing the corresponding testing case execution result statistical data.

17. The information interaction testing method based on the associated testing case automatic generation as claimed in claim 16, characterized in that, said step (A3) further comprises:
- (C1) loading said associated testing case file into the memory based on said configuration file, and generating the request message applicable to the system under test according to the predefined rules based on said associated testing case file;
- (C2) transmitting said request message to the system under test;
- (C3) receiving the answer message corresponding to said request message from the system under test within the predefined time threshold; and
- (C4) judging whether said answer message is valid based on the predefined rules, and if the judgment result is "valid", then further verifying whether said answer message conforms to the test requirements according to the verification condition corresponding to said associated testing case file in said configuration file, and storing the corresponding testing case execution result statistical data.

18. The information interaction testing method based on the associated testing case automatic generation as claimed in claim 17, characterized in that, said step (A1) further comprises: judging whether the reference information interaction corresponding to said reference testing case file needs to produce subsequent associated information interactions based on the predefined rules, and if the judgment result is "need to produce subsequent associated information interactions", then executing the step (A2).

19. The information interaction testing method based on the associated testing case automatic generation as claimed in claim 18, characterized in that, said step (A3) further comprises: judging whether the associated information interaction corresponding to said associated testing case file needs to produce subsequent associated information interactions based on the predefined rules, and if the judgment result is "need to produce subsequent associated information interactions", then executing the step (A4).

* * * * *